United States Patent [19]

Johnson

[11] 4,179,087
[45] Dec. 18, 1979

[54] GYROSCOPE RATE RANGE SWITCHING AND CONTROL SYSTEM

[75] Inventor: James S. Johnson, Phoenix, Ariz.

[73] Assignee: Sperry Rand Corporation, New York, N.Y.

[21] Appl. No.: 847,861

[22] Filed: Nov. 2, 1977

[51] Int. Cl.² ............................................. G01C 19/28
[52] U.S. Cl. ..................................... 244/175; 33/326; 74/5.6 D
[58] Field of Search ......................... 244/175; 364/453; 33/326; 74/5.6 D, 5.6 E

[56] References Cited

U.S. PATENT DOCUMENTS

| | | | |
|---|---|---|---|
| 2,887,636 | 5/1959 | La Hue | 74/5.6 D |
| 3,477,298 | 11/1969 | Howe | 74/5.6 E |
| 3,555,692 | 1/1971 | Aberle | 33/326 |

Primary Examiner—Trygve M. Blix
Assistant Examiner—Reinhard J. Eisenzopf
Attorney, Agent, or Firm—Howard P. Terry

[57] ABSTRACT

An automatic rate range switching and control system adapts the full range of an analog output signal of a gyroscopic rate sensor to a range consistent with the precision conversion thereof into a digitally compatible signal. In a digital strapped down inertial reference system, for example, a plurality of strapped down, force-rebalanced rate sensors is used to sense aircraft body rates, wherein each gyro pick off signal is fed back to the gyro torquer in a manner to maintain the pick off signal essentially null, the torquer current signal thus being proportional to the sensed aricraft rate. The full range of the gyro's rate sensing capability may extend from zero to several hundred degrees per second. However, with the present invention, the switching and conversion of the analog rate signal into a digitally compatible signal is necessary only over a limited range. The current switching is accomplished by means of a rate tracing gate voltage rate switch for protecting the switching devices from destructively high switching voltages.

14 Claims, 4 Drawing Figures

GYROSCOPE RATE RANGE SWITCHING AND CONTROL SYSTEM

BACKGROUND OF THE INVENTION

1. Field of the Invention

The present invention relates generally to gyroscopic reference systems of the type including a plurality of strapped-down force rebalanced gyroscopic rate sensors for measuring craft rotation rates about its primary axes, together with a digital computer for computing from such measures aircraft stabilization and attitude data, for example. More specifically, the invention relates to rate range switching and control apparatus for adapting the full range of the gyroscope analog rate output signal to a range consistent with the range of precision conversion of the analog signal into a corresponding digitally compatible signal, for example, consistent with the precision range of a voltage-to-frequency converter. The invention comprises circuit apparatus for providing a rate tracking gate voltage for protecting the solid state switching devices of the system from destructive voltages.

2. Description of the Prior Art

Strapped-down gyroscopic reference apparatus for aircraft and space vehicles is well known to those skilled in the art of gyroscopic aircraft control systems and many gyro configurations and control systems based thereon have been described extensively in the literature. In general, such systems include a plurality of single-degree-of-freedom or two-degree-of-freedom rate sensors strapped down to the vehicle (usually skewed with respect to the vehicle primary coordinate axes for redundancy purposes) for measuring the angular velocities of the vehicle about its primary coordinate axes which data, along with vehicle acceleration and heading data, is supplied to a digital computer to provide output data for use in stabilization, control, navigation, and guidance of the aircraft. Since the gyros are strapped to the airframe, it will be appreciated that the rate sensors will be of the force or torque rebalance type; that is, the gyro is maintained substantially aligned with its support case by feeding the gyro pick off signal back to the gyro torquer in a manner to maintain the pick off signal essentially null, the torquer current so required being a measure of the rate being sensed by the gyro. A typical two-degree-of-freedom rate sensor of this type is disclosed in the present assignee's U.S. Pat. No. 3,529,477.

It will be appreciated that the ultimate output signal of the sensor must be compatible with the requirements of digital computation. One way of accomplishing this might be to convert the gyro pick off signal, for example, to a duty-cycle-modulated square wave of a suitable frequency and to apply this signal to the torquer and together with suitable clock pulses provide a frequency count proportional to sensor rates. Another way would be to convert the gyro pick off signal to a proportional direct current and then to apply this current through the torquer to a precision resistor being used to produce a corresponding voltage and to apply this voltage as an input to a voltage-to-frequency converter to provide a frequency proportional to the sensed rate. The present invention relates to the latter conversion technique.

During normal operation of commercial aircraft, body rates are relatively low, being of the order of 0° to 30° per second. However, flight safety considerations dictate that the rate gyro be capable of measuring body rates greater than the aircraft design maximum; such rates may be on the order of 150° per second or more for commercial aircraft. Of course, military aircraft are designed to be capable of body rates of several hundred degrees per second and the strapped down rate gyros must be capable of sensing such rates for these applications. Thus, the range of torque feed back currents and the corresponding sensed voltages may be quite large. Also, the conversion precision of a voltage-to-frequency converter is, within reasonable circuit complexity and cost restraints, limited to a relatively narrow input voltage range, substantially smaller than the range of voltage corresponding to the full gyro torquer current range, so that if the full range of voltage resulting from the torquer current were applied to this converter it would saturate at the higher voltage levels.

The present invention overcomes the above conversion range deficiency by a unique switching circuit responsive to the gyro pick off signal for switching the torquer current between different voltage sensors so as to maintain the input voltage to the converter within the converter's precision range. Actuation of the switching means also alerts the digital computer that the range scale factor has been changed.

Depending upon the design of the rate range switching and control system, the solid state switching means may have to switch relatively high currents very rapidly, which factor severely limits the choice of available switches. For example, a switch that can handle the high currents may be restricted in terms of switching voltage; i.e., if the effective turn-on voltage exceeds a predetermined value, the switch will be destroyed. The present invention overcomes this difficulty by rate tracking circuit means which maintains the effective switch voltage substantially constant over the range of gyro rates.

SUMMARY OF THE INVENTION

The present invention provides automatic rate tracking switching and control apparatus for use, for example, in a digital strapped down inertial reference system for aircraft, which apparatus adapts the full range of the analog output signal of the system force rebalance rate sensors to a range consistent with the precision conversion of such a signal to a signal compatible with digital computation techniques; that is, consistent with the precision or linear conversion characteristics of a voltage-to-frequency converter.

The conversion of current flowing through the gyro torquer into digital data is provided by running the torquer current through a precision resistor and using the voltage developed across the resistor as the input to a voltage-to-frequency converter. The converter creates a frequency which is a function of its input voltage, and this frequency is counted and transmitted to the computer. The computer accumulates these numbers as aircraft rate data and integrates this data to determine aircraft attitude. In order to conduct the current required to null the gyro at abnormal or high maneuvering rates without exceeding the input range of the voltage-to-frequency converter, the resistance of the voltage sensor should be relatively small. However, achieving sufficient accuracy during normal cruising conditions requires a high value for the voltage sensing resistor. In order to accommodate these conflicting requirements, two differently valued sensing resistors are used. Normally, switches select the low rate sensor as the path for the torquer current and the input to the converter. However, if the output of the torquer amplifier exceeds a certain voltage, implying high maneuvering rates, then the switches select the high rate sensor.

The present invention overcomes a limitation of certain types of solid state switches employed to switch the rate voltage to the voltage-to-frequency converter. Many solid state switches have a limited range of voltage which they are capable of handling without damage. Therefore, the present invention provides a circuit whereby the rate gyro feed back voltage is tracked and is supplied to the switch elements to maintain their switching voltage ratios within the safe operating limits.

DESCRIPTION OF THE PREFERRED EMBODIMENTS

The tracking gate switch of the present invention is used for rate-range command switching, operating to facilitate the analog-to-digital conversion of the rate gyroscope outputs of an aircraft digital, strapped-down attitude and heading reference apparatus. The rate gyroscopes of such apparatus may be dual-axis, torque feed back flexure gyroscopes of the general kind described in U.S. Pat. Nos. 2,719,291 and 3,529,477, both assigned to Sperry Rand Corporation. These patents describe the structure and operation of typical tuned flexure rate gyroscopes. Such gyroscopes are characterized by having a gyroscopic rotor that is, in effect, freely suspended by flexure support members for spinning about a spin axis by means of an electric-motor-driven shaft journalled in the instrument casing. Universal tilting of the gyroscope rotor about a pair of axes perpendicular to the normal spin axis is permitted by the flexure support.

Figure 1:
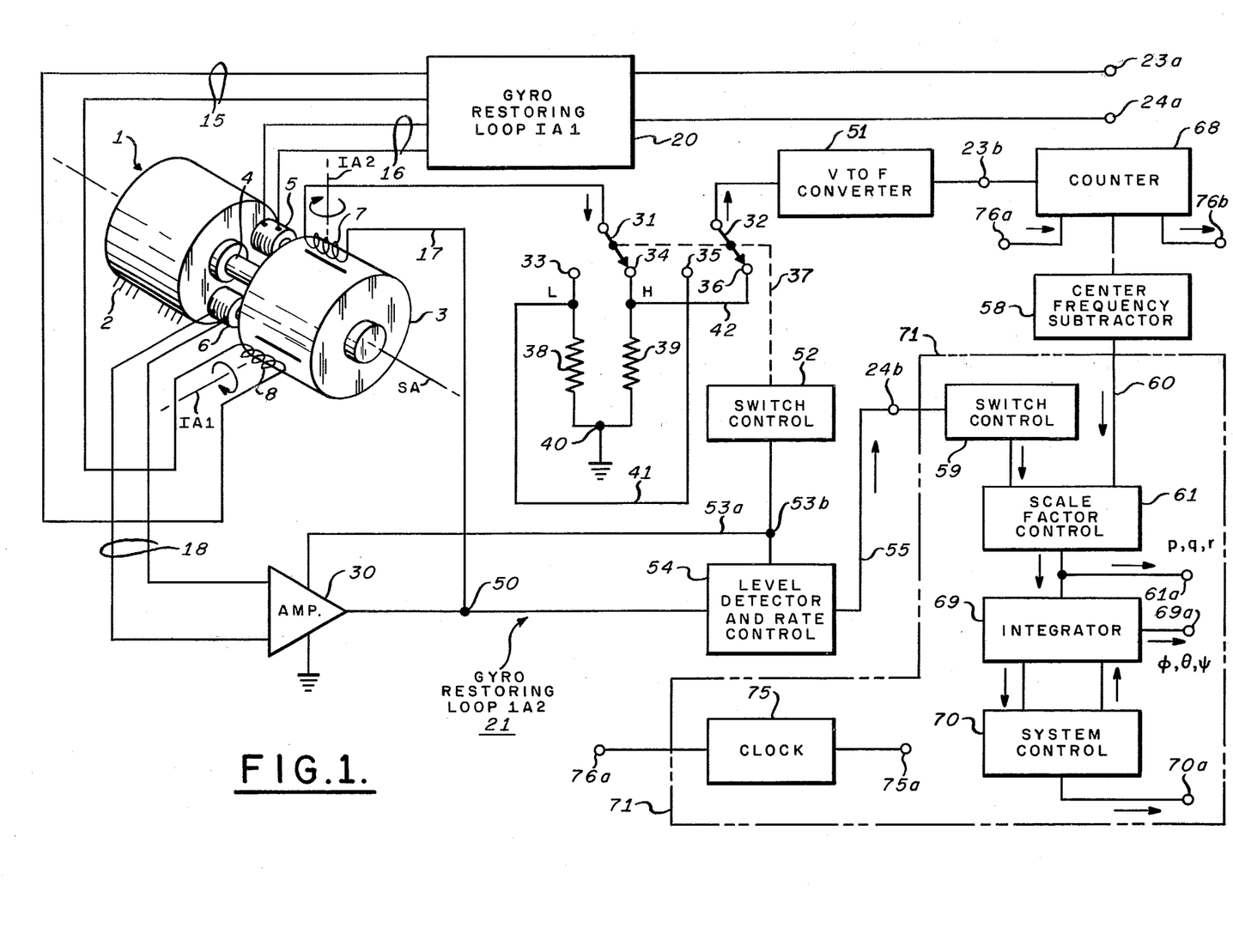
FIG. 1 is a block diagram showing a typical torque rebalanced rate gyroscope and a circuit diagram of the range rate switching system in association with an aircraft strapped-down inertial reference system, illustrating components thereof and their electrical interconnections.

Such gyroscopic instruments are normally supplied with 90° spaced apart pairs of inductive pick offs for detecting angular displacement of the rotor with respect to its spin axis SA (FIG. 1) about mutually perpendicular inertial axes IA1 and IA2. Cooperating quadrature-spaced pairs of similarly disposed torquing coils are also normally present. In FIG. 1, purely as a matter of convenience, each such pair of torquer coils is schematically represented by respective single torquer coils 7, 8 and each such pair of inductive pick offs is schematically represented by respective single pick off coils 5, 6. Normally, the signal from pick off coil 6, for example, is kept at null by passing it through leads 18 and high gain amplifier 30 into torquer coil 7 to precess the gyroscope rotor 3 opposite to the precession caused by the input rate, thus keeping rotor 3 essentially aligned with the instrument casing 1, which case 1 is affixed to the craft 2. As noted, the rotor 3 is flexibly mounted on shaft 4 and is spun by a motor inside of the instrument casing 1. In a similar manner, the signal from the quadrature pick off coil 5 is nulled through the gyro restoring loop 20 via leads 16, 15 into torquer 8. It will be recognized, therefore, that the current driven into any one torquer coil 7 or 8 is proportional to the rate at which the gyroscope casing 1 is being rotated as the craft itself correspondingly rotates about a respective inertial axis IA1 or IA2. As the craft 2 on which the gyroscope is fixed rolls, for example, the gyroscope rotor 3 is maintained substantially fixed with respect to casing 1 by precessing rotor 3 in roll at the same rate that the craft is rolling. Consequently, craft roll rate, for example, can be precisely measured if the current passing through the corresponding torquer coil 7 or 8 is accurately measured.

In what follows, it will be understood by those skilled in the art that the control systems respectively associated with inertial axes IA1 and IA2 are substantially similar. The gyroscope rotor position-restoring loop 20 uses tilt signals derived with respect to axis IA2 by pick off 5 to supply precession signals via leads 15 to the IA1 axis torquer coil 8. Similarly, the gyroscope rotor restoring loop 21 uses tilt signals derived with respect to axis IA1 by pick off 6 to supply precession signals via leads 18, 17 to the IA2 axis torquer coil 7. Certain corresponding control signals are generated in gyroscope rotor position-restoring loops 20, 21 and appear at the respective junctions 23a, 24a, and 23b, 24b for use as will be further discussed. Since the control loops 20, 21 are of similar structure, only loop 21 need be discussed in detail. Elements coupled to terminals 23a, 24a of restoring loop IA1 are similar to those coupled to terminals 23b, 24b with respect to restoring loop IA2.

As shown in FIG. 1, the invention is represented in the form of the gyroscope rotor position-restoring loop 21 for axis IA2 and couples the output of pick off 6 via leads 18 and amplifier 30 into a lead branching at junction 50. The signal at terminal 50 is coupled to the level detector and rate control circuit 54 whose output appears on lead 55 and at terminal 24b and also at the input 53b of switch control 52. Control 52 determines whether the ganged switch blades 31, 32 respectively contact switch terminals 33, 35 or 34, 36. In practice, these devices will be wholly-electronic solid state switches. The output of level detector and rate control 54 is also coupled via lead 53a to a gain control input of torquer amplifier 30 to compensate for the change in load impedance seen by amplifier 30 when the sensing resistor 38 or 39 is changed.

The second lead branching at terminal 50 conducts the amplified pick off current through one of leads 17, torquer coil 7, and the second of leads 17 to the blade of switch 31. Terminals 33, 34 of switch 31 are respectively coupled to ground at junction 40 through precision calibrated resistors 38, 39. The terminals 33, 34 are also respectively coupled to switch terminals 35, 36 associated with the second switch blade 32 via the respective leads 41, 42. Blades 31, 32 are cooperatively positioned by a mechanical or other link, such as the conventional mechanical link 37 driven by switch control 52 to one extreme position or the other. The voltage on switch blade 32 is proportional to torquer current and is supplied as an input to the conventional voltage-to-frequency converter 51 which provides a frequency output at terminal 23b proportional to torquer current and hence to craft turn rate. It will be appreciated that the mechanical switches 31, 32 are in practice electronic solid-state switches such as semiconductor switches, as will be further discussed.

In the operation of the apparatus as thus far described, it is desired to convert the amplitude of the current flowing through torquer coil 7, for example, into data in a form compatible for use with a digital computer generally represented at 71. To convert the torquer current into a corresponding voltage, it is passed through one of the precisely calibrated sensor resistors 38 or 39. The voltage drop across the selected resistor is used as the input of the voltage-to-frequency converter 51. The converter 51 is a conventional device for generating an output signal whose frequency is proportional to its input voltage amplitude, and this frequency is supplied to a counter 68 whose output is coupled to a center frequency subtracter 58, whose output is in turn supplied to a digital computer 71. The computer accumulates the counts, which are proportional to craft rates about particular axes to provide aircraft rate stabilization signals p, q, and r at terminal 61a, and integrates them in the conventional manner to convert time to measures of craft altitude $\phi$, $\theta$ and $\psi$ at terminal 69a for conventional aircraft control and display purposes, such as at terminals 69a and 70a. The counting or sampling times for counter 68 are determined in a conventional manner by clock 75 which supplies timing signals to counter 68 via lead 76a. Similar clock signals at terminal 75a are used for synchronizing purposes yet to be discussed with respect to FIG. 3A. Clock 75 may also perform the timing of the operations of conventional functions in the usual way within computer 71.

In order to be capable of conducting the maximum current that may be required to null the position of gyroscope rotor 3 with respect to casing 1 at high craft turn rates without exceeding the input range for voltage-to-frequency converter 51, the resistance of the sensing resistor, such as resistor 38, should be small. However, a relatively high resistance value is required for the sensing resistor if sufficient accuracy is to be held during normal cruising conditions of the craft. Thus, to resolve this conflict, different resistance values are used according to the invention for sensing resistors 38, 39. For the low rates associated with craft cruising conditions, switches 31, 32 under control of level detector 54, select the high resistance sensing resistor 39 as the path for the current from torquer coil 7 for providing the input voltage to converter 51. However, when the output of power amplifier 30 exceeds a predetermined level, implying high craft-maneuvering rates, level detector 54 changes state and switch control 52 then control switches 31, 32 automatically to select the high rate or low resistance sensor resistor 38. In this manner, the input to the voltage-to-frequency converter is maintained within its linear conversion range without danger of saturation.

Voltage-to-frequency converter 51 is a conventional device capable of converting either positive or negative input voltages to corresponding distinguishable frequencies. For this purpose, the converter is appropriately biased to provide an effective "zero" frequency. In one form of the invention, a "zero" signal frequency of 40 kHz is produced for a zero voltage or zero rate input. Finite input voltages then develop a frequency change above or below the 40 kHz value. For example a +10 volt input may develop a 64 kHz output; on the other hand, a −10 volt signal at the input may develop a 16 kHz output. The frequency subtracter 58 is used in a conventional manner to remove the effect of the bias or center frequency by simply subtracting a count proportional to the center or effective "zero" frequency and to the sample time. If the converter 51 output frequency were counted say, for one second, then the frequency subtracter 58 would subtract, for example, 40,000 from the accumulated count. For the same example, the residual count would be +24,000 if the input was +10 volts, or −24,000 if the input was −10 volts. Obviously, for lower voltages, the count is proportionally reduced.

The foregoing residual count is now to be converted to determine the corresponding rotational increment for the one-second sample. However, which of the rate sensing resistors 38, 39 is selected must be accounted or compensated for in computer 71 in the conversion from counts to the corresponding angular rate value. A count of +24,000 indicates that the input to converter 51 was +10 volts, but this voltage corresponds to either of two different angular rates, depending upon which rate sensing resistor 38 or 39 is in the circuit. On this account, a signal is provided to computer 71 via lead 55 from the level detector rate control 54 defining which sensing resistor was engaged during the corresponding time and, thus, which of two scale factors is to be used in the computation by computer 71. By way of example, if the low rate sensing resistor 38 is selected by switch 31, +10 volts will be developed across resistor 38 at a turn rate of 20° per second, and a scale factor of 3 arc seconds per count will yield 20° per second for 24,000 counts per second. On the other hand, the high rate resistor 39 with +10 volts developed thereacross at a craft turn rate of 160° per second and the corresponding scale factor of 24 arc seconds per count will yield a 160° per second turn rate for 24,000 counts per second. In actual practice, other sampling periods, preferably much smaller, may be used, and the output data is further processed by computer 71 to provide the final aircraft control, display, and guidance functions.

In one form of the invention, the output of voltage-to-frequency converter 51 at terminal 23b may be, for example, supplied to a conventional frequency mixer or subtracter 58, where the center frequency is subtracted from the counter 68 output. The difference-frequency output of subtracter 58 is thus supplied via lead 60 to scale factor control 61 which by means of switch control 59 operated by level detector 54, operates to select the scale factor corresponding to which of the resistors 38, 39 is in the torquer circuit and to whether the count from subtracter 58 represents a low rate or a high rate.

The foregoing elements 59, 61 thus constitute compensator circuit means for rendering the output of counter 68 independent of which of the impedances 38, 39 is switched into the gyro torquer circuit and thus accounting for their different impedance values.

A significant problem encountered in the switching system for selecting one or the other of the rate sensor resistors 38, 39 lies in suitably controlling the torquer current path over the full range of voltages involved. The torquer current required to null the gyro output may be substantial; thus the current to be switched may likewise be large. This severely limits the number of suitable commercially available switches from which a selection may be made. The semiconductor switches that can safely handle the current level each have various other problems, such as a limited range of switching voltage. Of course, mechanical switches are not acceptable because of their very slow switching speeds.

The object of the present invention is to permit the selection and use of available semiconductor switches that have an otherwise undesirable voltage range limitation. For example, one switch acceptable as to current switching capability is a vertical gate MOSFET or VMOS switch manufactured by Siliconix, Inc. of Santa Clara, Calif. However, the gate-to-source voltage required to turn on such a switch is about +10 volts but the maximum value of the gate-to-source voltage is +15 volts. Because the source voltage may be as high as +10 volts, the gate voltage must be +20 volts to turn on this switch. With a +20 volt gate voltage, a source voltage falling below +5 volts will destroy the switch.

Figure 2:
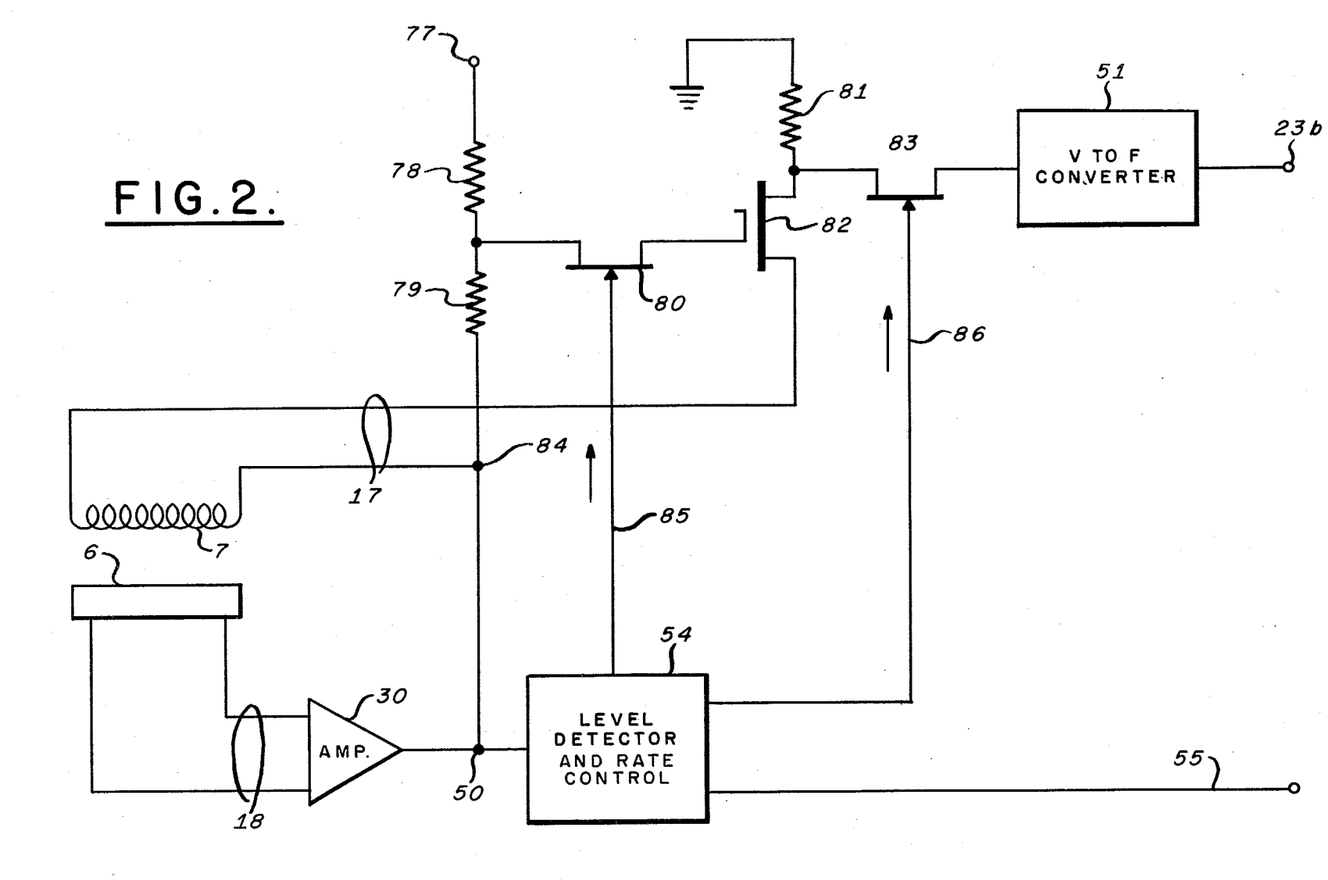
FIG. 2 is a simplified schematic diagram illustrating the basic principles of the novel rate tracking switching circuit of FIG. 1.

FIG. 2 presents an explanatory schematic of the invention showing a circuit for providing the desired tracking gate voltage required in preventing destruction of the semiconductor switch for controlling one of the sensors 38, 39 of FIG. 1 and for controlling but one of the gyro torquer currents. As in FIG. 1, there are present a gyro rotor 3, a torquer coil 7, pick off coil 6, torquer amplifier 30, level detector and rate control 54, and voltage-to-frequency converter 51 for supplying the variable frequency signal at terminal 23b, while resistor 81 corresponds to one of the sensors 38, 39. The output of torquer amplifier 30 is again supplied through junction 50 and through torquer coil 7 via leads 17 to the switching system; the output of amplifier 30 also controls circuit 54. Junction 50 is also coupled via junction 84 through series resistors 79, 78 to the power source terminal 77, the common junction between resistors 78, 79 being coupled through the source-drain circuit of JFET transistor 80. A series current path is supplied through torquer coil 7, the source-drain circuit of VMOS transistor 82, and resistor 81 to ground. The gate electrode of JFET transistor 80 is controlled by level detector circuit 54, as by lead 85, while the gate electrode of JFET transistor 83 is also controlled by circuit 54, as by lead 86. The source-drain circuit of the latter field effect transistor 83 is coupled to the junction between resistor 81 and transistor 82 to provide the sensed input voltage to voltage-to-frequency converter 51.

When the rate controller of circuit 54 supplies a predetermined switching signal via lead 85 to the gate electrode of transistor 80, its source-drain circuit is rendered conducting, and whatever control voltage is at the junction between resistors 78, 79 is coupled to the gate electrode of the VMOS transistor 82, switching the torquer current to resistor 81. The applied control voltage is generated by combining a voltage proportional to the current output of torquer amplifier 30 (the voltage across resistor 79) with a predetermined voltage across resistor 78 derived by a voltage source at terminal 77 arbitrarily selected as substantially the maximum possible gate reference voltage. When the current output of torquer amplifier 30 is at its maximum positive value, the voltage applied to the gate electrode of rate sensor switch transistor 82 may be about +22 volts, for example, while the source electrode voltage level of transistor 82 may be +10 volts, for example, yielding a difference voltage of 12 volts. Now, if the magnitude of the output of torquer amplifier 30 falls, the gate voltage at transistor 82 and the source electrode voltage are correspondingly reduced, so that the voltage between gate and source electrodes still remains relatively constant. For example, if the source electrode voltage is reduced to about 31 10 volts, the gate voltage will correspondingly fall to about −1 volt; accordingly, over the full range of possible source electrode voltages, the voltage rendering transistor 83 conducting is reasonably close to a constant +10 volts, safely within the voltage parameters of VMOS transistor 82. Such is accomplished by the action of the invention in tracking the rate gyroscope feed back current and in supplying a version of it to the switching elements so as to maintain voltages applied thereto within a safe operating range.

Figure 3A:
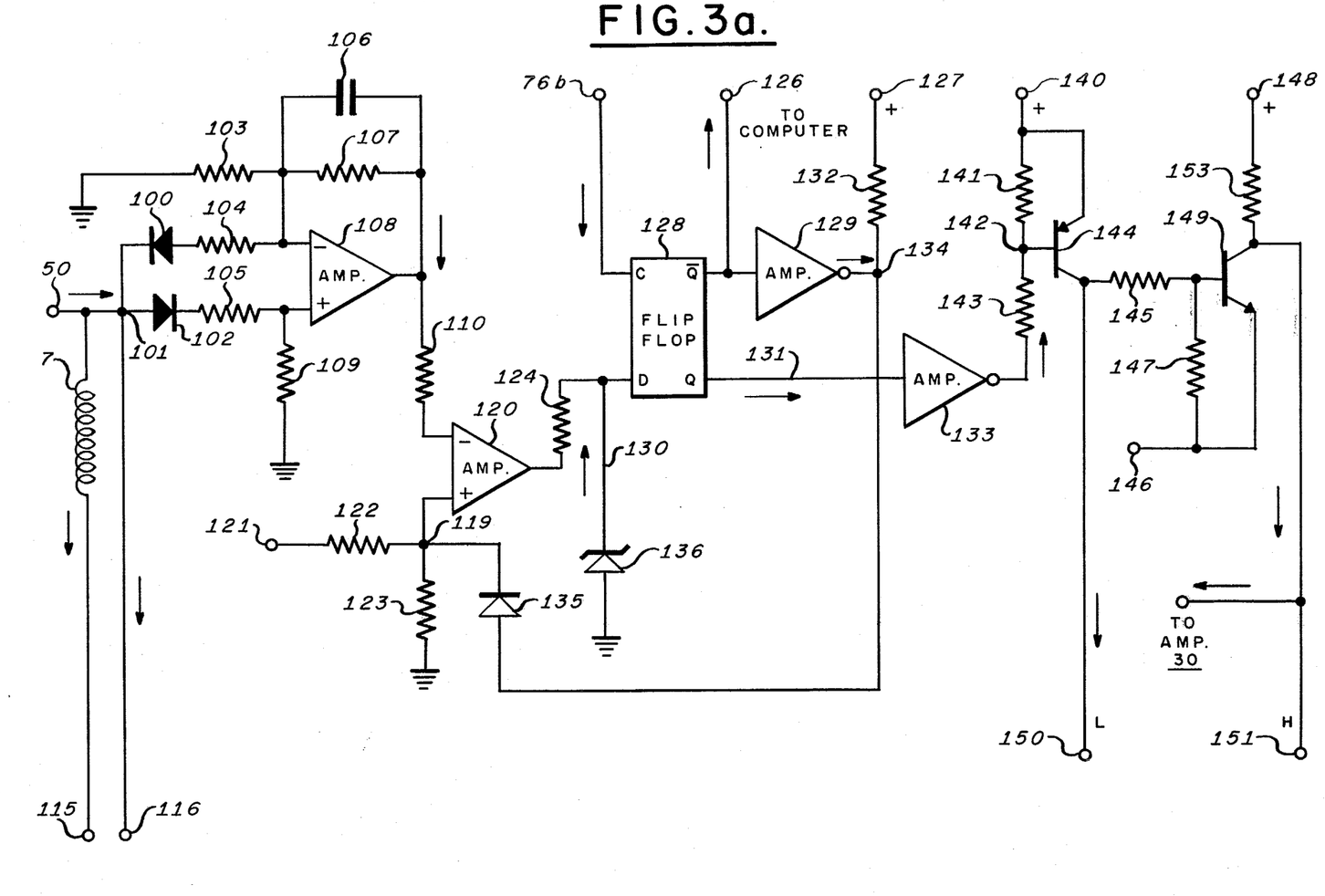
FIGS. 3A and 3B together constitute a diagram of a preferred circuit for carrying out the invention.
Figure 3B:
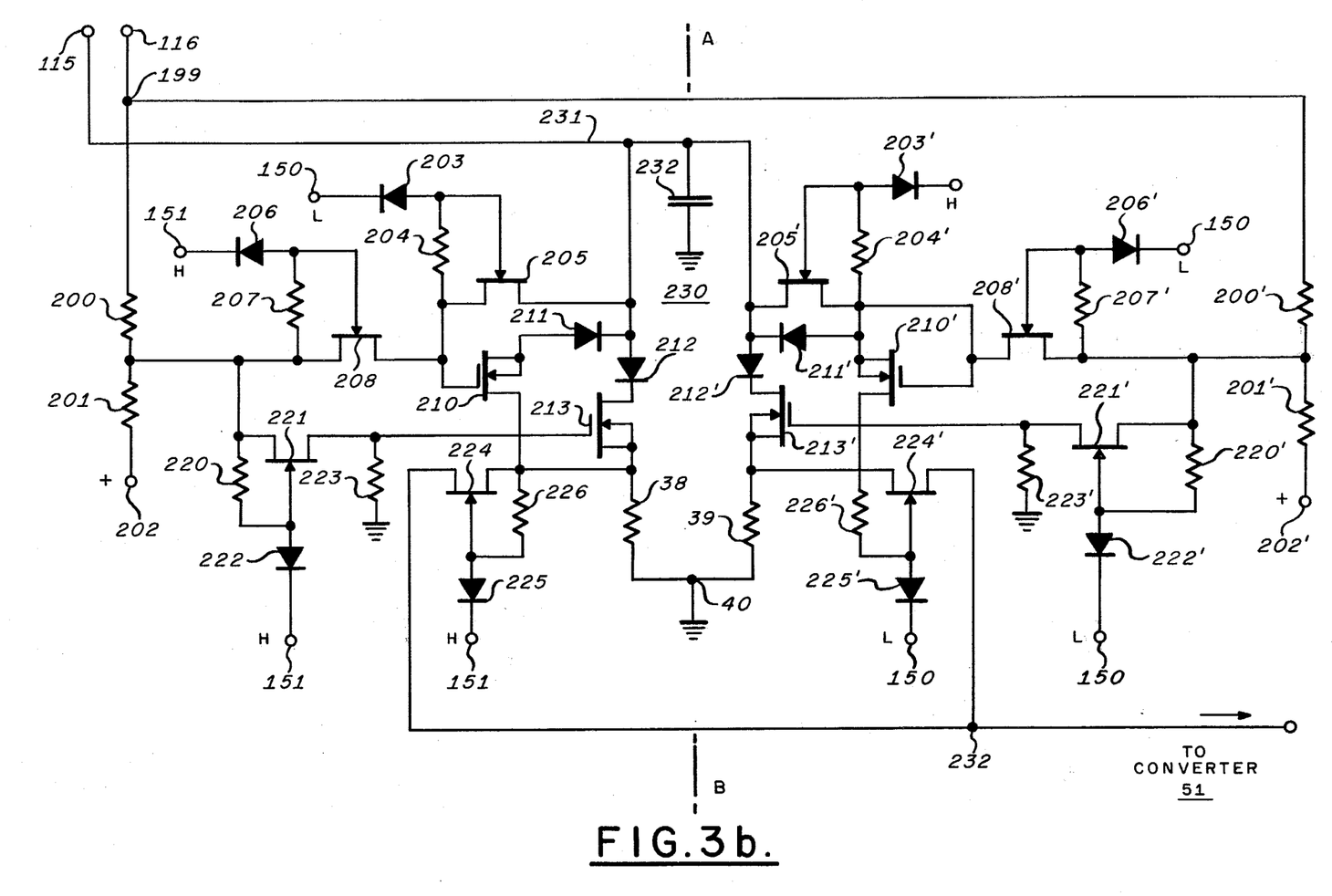

One embodiment of practical circuits within the level detector and rate control 54 and the switch control 52 of FIG. 1 appears in FIGS. 3A and 3B. The high and low rate sensing resistors 38, 39 appear at the low middle portion of FIG. 3B. FIG. 3A includes in series connection, an absolute value detector associated with amplifier 108, a level detector associated with amplifier 120 and flip-flop 128, and a rate select driver circuit associated with inverting amplifiers 129, 133 and transistors 144, 149. FIG. 3B depicts the circuits that select the rate sensing resistor of resistors 38, 39 that provides a current path from the low side of rotor torquer coil 7 to ground, the voltage sensed thereby being transmitted to voltage-to-frequency converter 51 of FIG. 1.

Referring first to FIG. 3A, the output of torquer amplifier 30 at terminal 50 is coupled through torquer coil 7 and terminal 115 to sensing resistors 38, 39 of FIG. 3B. Terminal 50 is also coupled through junction 101, diodes 100, 102, and resistors 104, 105 to the differential amplifier 108, the circuit being poled as indicated in the drawing to provide an absolute value detector. The positive and negative inputs of amplifier 108 are coupled to ground via resistors 103 and 109. Suitable low pass filtering is provided by a shunt capacitor-resistor circuit 106, 107. The absolute value detector is a conventional circuit adapted for rectifying both polarities of a bipolar input signal so that a signal of only one predetermined polarity appears across its output resistor 110. Thus, there is generated a positive signal to be sensed by the next following level detector circuit for either polarity of the torquer drive signal; accordingly, a single level detector circuit may be used to generate a high rate mode command for either positive or negative angular input rates.

The conventional level detector circuit associated with amplifier 120 has one input coupled to resistor 110 and a second input coupled through junction 119 and resistor 122 to a fixed positive reference voltage supply (not shown) at terminal 121 and also to ground through junction 119 and resistor 123. The two input are poled as indicated in the figure. The level detector compares the input voltage at resistor 110 from the absolute value detector with the reference voltage supplied at terminal 119. As long as the reference voltage on terminal 119 is greater than the input supplied by resistor 110, the low rate mode command of detector 120 is provided (+12 volts, for example). However, when the input signal from resistor 110 exceeds the voltage supplied to detector 120 from junction 119, detector 120 switches to its high rate mode command level. The high rate mode command (−12 volts) is equal to but opposite in polarity with respect to the low rate mode command (+12 volts).

The output of level detector 120 is coupled through series resistor 124 with respect to the shunting, grounded Zener diode 136 to one input of flip-flop 128, elements 124, 136 conveniently acting to limit the level detector output signals to +5 and zero volts, rather than the respective ±12 volts levels of the example thus far being discussed. A change-enabling pulse, which may be about 0.1 milliseconds long, is applied at a predetermined time at terminal 76b to the C input of flip-flop 128 to transfer the rate mode command selected by the level detector to one of the Q and $\overline{Q}$ outputs of flip-flop 128. Thus, through the subsequent circuits of FIG. 3A, the rate command switches 31, 32 respond to the selected rate, and computer 71 is at the same time informed via leads 126 and 55 (FIG. 1) so that switch control 59 will be controlled to select the appropriate scale factor via scale factor control 61.

It will be understood that flip-flop 128 of FIG. 3A is used because it is not permissible to change the computer counting rate during the sampling time. In other words, the counts passed to scale factor control 61 by counter 55 and by subtracter 58 must be for a full sampling time interval and not for a fraction thereof; otherwise, the rate output and the output of integrator 69 will have false values. The change-enabling pulse is provided on terminal 76b of converter 51 (FIG. 1) at each time a sampling period ends. Clock 75 may be the same clock as that which synchronizes computer 71. In the present configuration, clock 75 additionally supplies synchronizing pulses via lead 76b that determines the counting or sampling periods of counter 68. Consequently, a change-enabling pulse appears at lead 76b substantially at the end of each successive sampling time to set the output of flip-flop 128 for the next sampling period, flip-flop 128 holding this output steady until the end of that sampling time. For example, when the D input of flip-flop 128 is low, the level detector having requested a high rate command, the Q output of flip-flop 128 will command high rate switch selection by going low with the next change-enabling pulse from clock 75. Simultaneously, the $\overline{Q}$ output of flip-flop 128 goes high to notify computer 71 through lead 126 that the sample is a high rate sample.

The $\overline{Q}$ output of flip-flop 128 is coupled through inverting amplifier 129 to one terminal 134 of resistor 132 whose opposite terminal 127 is connected to a positive voltage source (not shown, but providing, say, +15 volts). The output junction 134 of amplifier 129 is also coupled through diode 135 to junction 119 associated with amplifier 120. The Q output of flip-flop 128 is similarly connected through a second inverting amplifier 133 to the intermediate junction 142 of a voltage divider consisting of series connected resistors 141 and 143. The terminal 140 of the voltage divider 141, 143 opposite the output of amplifier 133 is coupled to a positive supply (not shown) delivering, say, +26 volts. The amplifiers 129, 133 act as rate command drivers.

When the output at terminal $\overline{Q}$ of flip-flop 128 is high, the output of inverter-amplifier 129 is low, in effect grounding the intermediate junction 134 of the voltage divider involving resistor 132 and diode 135. In this high rate command condition, the reference voltage supplied for level detector 120 at junction 119 is reduced, because of the absence of the current path through diode 135 which is back biased to the value established by resistors 122, 123 at about one volt. On the other hand, when a low rate command is to be controlling, there is no output from amplifier 129, and the reference voltage at junction 119 associated with level detector 120 rises, because it now primarily depends upon the presence of diode 135 and of resistors 123, 122, and 132, to a level of about +8 volts. This change in the voltage level at junction 119 provides desirable hysteresis and accommodates a change in the high voltage that is supplied to torquer coil 7, when the rate mode command is changed.

The Q output of flip-flop 128 drives the rate command semiconductor switches located in FIG. 3B via amplifier-inverter 133. For this purpose, the intermediate terminal 142 is coupled to the base of a transistor 144 whose emitter is coupled to the positive voltage supply terminal 140 and whose collector supplies control signals to the low rate (L) command terminal 150. The collector of transistor 144 is coupled through resistor 145 to the base of transistor 149, whose collector is coupled by resistor 153 to a conventional power supply (not shown) connected to terminal 148 and also to the high rate (H) command terminal 151. The emitter of transistor 149 is coupled to a negative source (not shown) at terminal 146 held at about −20 volts, for example. The L and H signals are supplied from terminals 150, 151 to several locations in the switching circuit of FIG. 3B, as will be described, particularly to eight discrete terminals marked L or H therein.

When the Q output of flip-flop 128 is low (for a high rate), the output of amplifier 133 is high, causing transistors 144 and 149 to be non-conducting, thus setting the high rate or H voltage on terminal 151 at about +30 volts and the low rate or L voltage on lead 150 at −20 volts, for example. When the Q terminal is high, the output of amplifier 133 is low, thus causing transistors 144, 149 to conduct and making the L output +26 volts and the H output −20 volts, for example. The H and L values drive the rate sensing resistor selector switches of FIG. 3B as well as the gain changer in the torquer amplifier 30 of FIG. 1 so as to compensate for changes in load impedance seen by torquer amplifier 30 when the active sensing resistor 38 or 39 is changed.

It is observed that the switching circuit of FIG. 3B is controlled by the L and H signals and also receives the output of torquer amplifier 30 of FIG. 1 on terminal 116 and a signal corresponding to current flow through rotor torquer coil 7 at terminal 115. Except for the manner in which the input leads associated with terminals 115, 116 are laid out, the circuit of FIG. 3B has essentially mirror image symmetry qualities with respect to line A–B, the torquer amplifier signal of terminal 116 branching at 199 to couple to one of the respective ends of a pair of similar voltage dividers 200, 201 and 200', 201', the second respective end terminals 202, 202' of the voltage dividers being connected to a positive power supply (not shown) providing about +26 volts, for example. The torquer coil signal at terminal 115 is supplied via lead 231 to a bridge-like circuit 230 at line A–B and including the two sensing resistors 38, 39. The bridge-like circuit 230 includes in series connection lead 231, diode 212, the drain and source electrodes of field effect transistor 213, sensor resistors 38 and 39, the source and drain electrodes of a field effect transistor 213', diode 212', and lead 231. At lead 231, the circuit 230 is coupled to ground through capacitor 232. Between sensor resistors 38, 39, the circuit 230 is directly grounded at terminal 40. Diodes 212, 212' are poled as shown in the drawing and are similar devices, as are the transistors 213, 213', which as previously stated, are preferably VMOS devices.

The two mirror image sides of the switching arrangement are similar and, for that reason, equivalent components to the left and the right of circuit 230 are identified similarly, the reference numerals to the right being primed versions of those on the left. The voltage level at the tap between resistors 200, 201 is coupled in series through field effect transistor 208 to the gate of MOSFET 210. There is also a series current path through MOSFET 210 and diode 211, poled as illustrated, to lead 231. A further series current path flows from the tap of voltage divider 200, 201 through field effect transistor 221 to the gate electrode of MOSFET 213, being also coupled to ground at resistor 223.

The high rate command or H signals of terminal 151 are coupled in three places in the left part of FIG. 1, while the L signals of terminal 150 are used there only at one input. Thus, the L signals are coupled only through diode 203, poled as shown, to the gate electrode of transistor 205 and also through resistor 204 to the series lead between transistors 208 and 205.

The high rate command signals H on terminal 151 are first coupled through diode 206, poled as shown, to the gate of transistor 208 and through resistor 207 to the lead between the tap of voltage divider 200, 201 and transistor 208. Second, the H signals are coupled through diode 222 to the gate of transistor 221 and also through resistor 220 to the tap between voltage divider resistors 200, 201. Third, the H signals are coupled through diode 225, poled as shown, to the gate electrode of an output field-effect transistor 224. The other two electrodes of transistor 224 find themselves in a series output circuit coupled between transistor 213 and sensor resistor 38 to converter 51. The drain electrode of MOSFET 213 is coupled through resistor 226 between diode 225 and the gate of transistor 224. The other end of resistor 226 is also coupled to provide a current path through transistor 210 to resistor 226. The right part of FIG. 3B is similarly constituted, but H, rather than L signals, are supplied through diode 203', and L signals are supplied through diodes 206', 225', and 222' rather than the H signals coupled to diodes 206, 225, and 222. The output of transistor 224' and that of transistor 224 are united at junction 232 for alternative supply to converter 51.

Since the circuits of FIG. 3B for selecting one or the other of the high and low sensing resistors 38, 39 are substantially similar, only the operation of the circuit when the high rate H is commanded need be described. If the H signal at terminal 151 is +30 volts, for example, transistors 208, 221, 224, and 205' are conducting. At the same time, and L signal is −20 volts and drives transistors 205, 208', 221', and 224' into their non-conducting situation.

When transistors 208 and 221 are conducting, they connect the gates of the transistors 210 and 213 to the tap between voltage divider resistors 200, 201. Divider 200, 201 then provides a gate drive voltage about +10 volts higher, for example, than the voltage on lead 231, thus developing a +10 volt difference between gate and source electrodes of VMOS transistors 210 and 213, causing them to conduct. VMOS transistors 210' and 213' are then non-conducting, transistors 208' and 221' being non-conducting, removing the gate drive voltage and transistor 205' being conducting, ensuring a zero gate-to-source voltage difference. Then, the only path that the current flowing through torquer coil 7 has available is through sensor resistor 38, transistor 210, and diode 211 or through transistor 213 and diode 212, depending upon the polarity of the current. The voltage developed across the sensing resistor 38 is supplied by output transistor 224 to converter 51. In this case, output transistor 224' is held non-conducting, so that the second sensor resistor 39 is not connected to the input of converter 51. The operation of the circuit is correspondingly the same for a low rate command except that the states of the conducting and non-conducting switching transistors are each reversed from the described situation.

Accordingly, it is seen that the invention adapts the full rate range of a gyroscopic angular rate sensor to the more limited range of precision of a voltage-to-frequency converter by providing automatic rate range or scale factor switching. To accommodate the full range of angular rates, dual gyro torquer current sensors are employed for maintaining the input to the converter within its linear range. Simultaneously with switching the sensors, the digital computer is advised of the change in scale factor so that it can adjust its operation accordingly. The system provides novel rate tracking semiconductor switching circuit means adapted safely to control the torquer current over the full wide range of associated switching voltage values without destroying the switches and without requiring exotic and expensive switching devices.

While the invention has been described in its preferred embodiments, it is to be understood that the words which have been used are words of description rather than of limitation and that changes may be made without departing from the true scope and spirit of the invention in its broader aspects.

What is claimed is:

1. In an inertial reference system for aircraft, apparatus for adapting the full angular rate range characteristics of a rebalanceable rate gyroscope, having pick off means and rebalancing torquer means, to operation with converter means having a limited precision conversion range, said apparatus comprising:
    amplifier means responsive to said pick off means for supplying a rebalancing torquing current to said torquer means,
    first and second impedance means having different characteristic impedance values,
    switch means for selectively placing said first or said second impedance means in series relation with said amplifier means and said torquer means whereby selectively to provide first and second voltages corresponding to said torquer current,
    detector means responsive to the output of said amplifier means for selection of said first or said second impedance means,
    voltage-to-frequency converter means having a linear conversion range less than said gyro rate range and responsive to the voltage developed across one of said first or said second impedance means for providing an output signal having a corresponding first or second frequency,
    counter means responsive to said voltage-to-frequency converter means for counting cycles of said first and second frequency and for producing a count output proportional to the rate sensed by said rate gyroscope,
    compensator circuit means responsive to said detector means for rendering said counter means output independent of which of said first or second impedance means is placed in said series relation by said switch means, and
    rate tracking circuit means responsive to said amplifier means for further controlling said switch means.

2. The apparatus as set forth in claim 1 wherein said switch means has a limited switching capability characteristic and wherein said rate tracking circuit means includes means for maintaining said switch means within its switching capability.

3. The apparatus as set forth in claim 2 wherein said switching means includes a solid state switch having a source-drain circuit responsive to said amplifier means and a gate electrode, the maximum voltage difference between said source-drain circuit and gate circuit being limited to a predetermined value, and wherein said rate tracking circuit means is coupled with said gate electrode for maintaining said actuator voltage below said predetermined value.

4. The apparatus as set forth in claim 3 wherein said rate tracking circuit means comprises:
impedance means responsive to said amplifier means and a reference voltage for supplying a switch control voltage which varies in accordance with the torquing current supplied to said torquing means, the maximum value of which is less than said predetermined value, and
further means responsive to said detector means for supplying said switch control voltage to said gate electrode of said switching means.

5. The apparatus as set forth in claim 4 wherein said switching means comprises a MOSFET transistor.

6. The apparatus as set forth in claim 5 wherein said switching means comprises a vertical gate MOSFET transistor.

7. Apparatus as described in claim 1 additionally including integrator means responsive to said counter means for producing craft attitude data.

8. Apparatus as described in claim 1 wherein said detector means includes circuit means responsive to said torque current supplying amplifier means and having dual output means for alternatively yielding positive and negative or negative and positive output signals according to whether said torquing current is high or low.

9. Apparatus as described in claim 8 wherein said detector means additionally includes semiconductor circuit means responsive to said dual output signals for selectively placing said first or said second impedance means in series relation with said torquer means and said voltage-to-frequency converter means.

10. Apparatus as described in claim 9 wherein said semiconductor circuit means includes:
absolute value detector means for rectifying the bipolar output of said amplifier means, thereby producing a unipolar output signal,
level detector means responsive to the amplitude of said unipolar output signal,
clock pulse generator means for supplying enabling pulses,
flip flop means having first and second outputs and responsive to said unipolar output and to said enabling pulses,
said level detector means being additionally responsive to said first output of said flip flop means for alternatively producing respective low and high amplitude signals, and
dual output amplifier means responsive to said respective high and low amplitude signals for alternatively producing respective positive and negative or negative and positive output signals at said dual outputs according to whether said torquing current is high or low.

11. Apparatus as described in claim 9 wherein said semiconductor circuit means further includes:
the source-to-drain current path of first field effect transistor means coupled in series with said torquer means, said first impedance means, and ground potential,
reference voltage divider means responsive in part to the output of said torquer amplifier means, and
first field effect transistor circuit means responsive to said reference voltage and to both of said signal processor dual outputs for rendering said first field effect transistor means source-to-drain current path selectively conducting or non-conducting whereby said first impedance means is selectively placed in series with said torquer means and said voltage-to-frequency converter means.

12. Apparatus as described in claim 11 wherein said semiconductor circuit means additionally includes:
the source-to-drain current path of second field effect transistor means coupled in series with said torquer means, said second impedance means, and ground potential,
second field effect transistor circuit means responsive to said reference voltage and to both said signal processor dual outputs for rendering said second field effect transistor means source-to-drain current path selectively non-conducting or conducting whereby said second impedance means is selectively placed in series with said torquer means and said voltage-to-frequency converter means alternatively to said first impedance means.

13. Apparatus as described in claim 1 wherein said compensator means includes scale factor control means responsive to said counter means and to said detector means for maintaining the output count of said counter means independent of the impedance selected by said switch means.

14. Apparatus as described in claim 13 additionally including center frequency subtractor means responsive to said counter means for establishing a reference frequency corresponding to an effective zero aircraft rate.

* * * * *